Dec. 22, 1970  J. W. CROOKS  3,548,680
PLANETARY TRANSMISSION

Filed June 23, 1969  3 Sheets-Sheet 1

Inventor
James W. Crooks
By Archie L. Fulton
Attorney

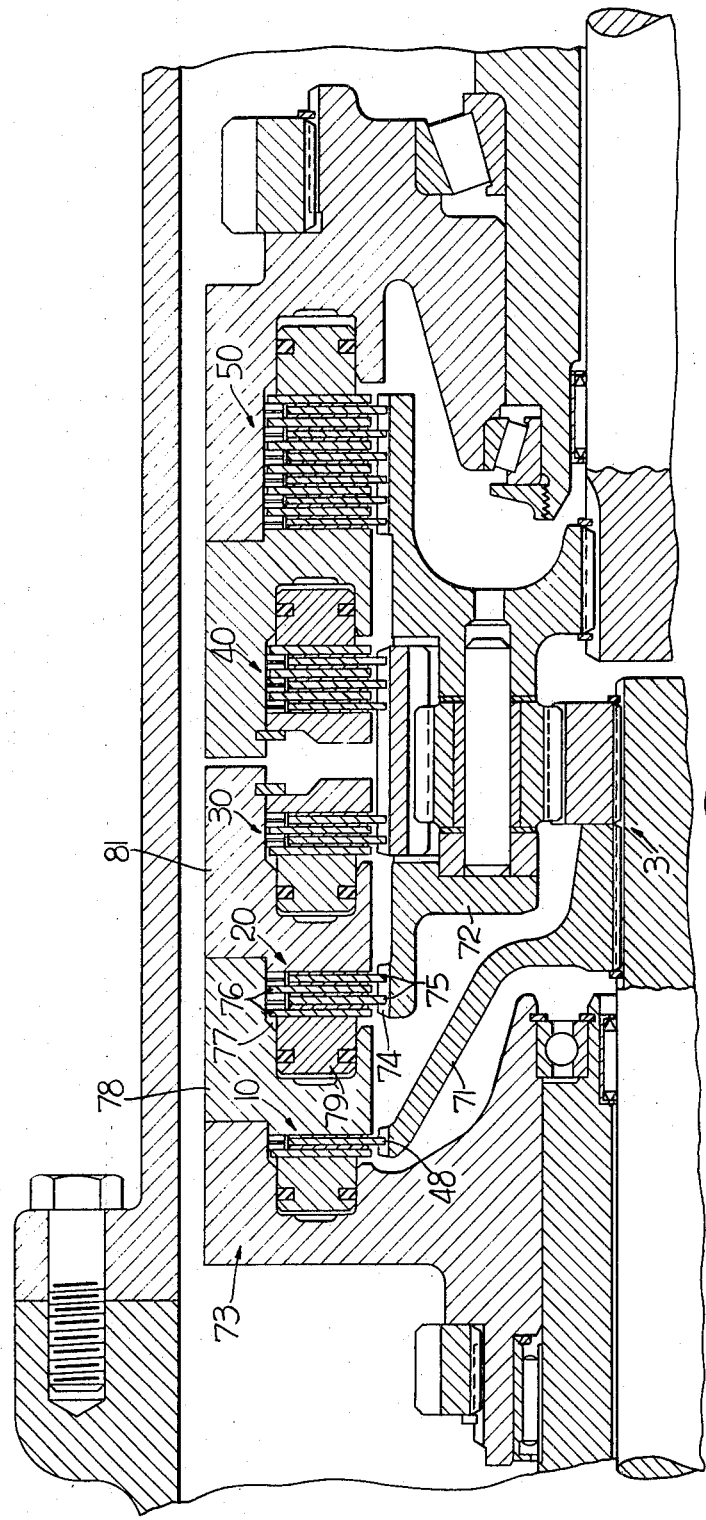

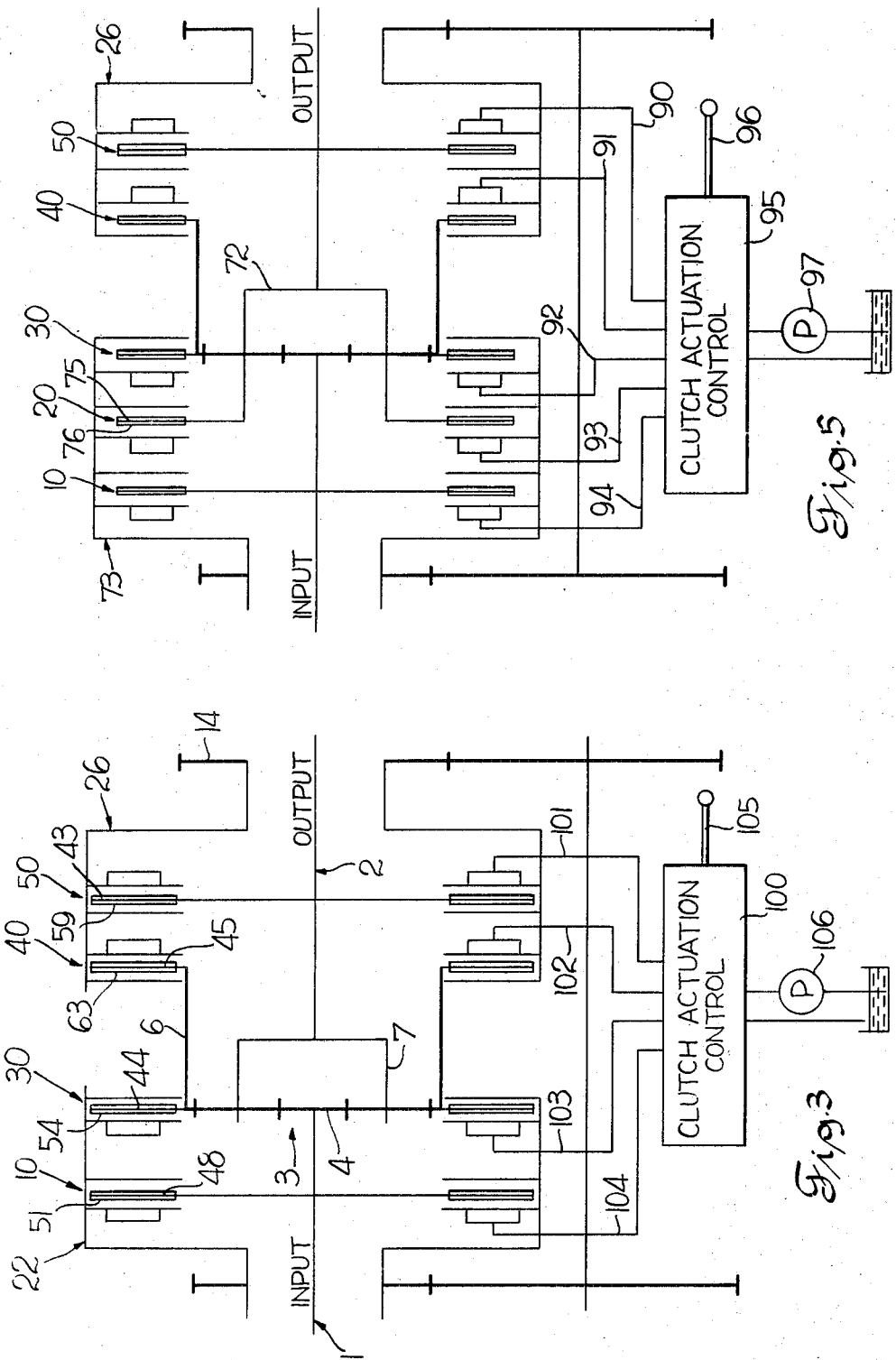

United States Patent Office 3,548,680
Patented Dec. 22, 1970

3,548,680
PLANETARY TRANSMISSION
James W. Crooks, Whitefish Bay, Wis., assignor to Allis-Chalmers Manufacturing Company, Milwaukee, Wis.
Filed June 23, 1969, Ser. No. 835,468
Int. Cl. F16h 3/44, 37/06
U.S. Cl. 74—682                                                                10 Claims

ABSTRACT OF THE DISCLOSURE

A planetary transmission having countershaft gearing connected between input and output clutch housings rotating concentrically with input and output shafts. Said clutch housing supporting a plurality of clutches for selectively clutching the sun gear, ring gear, and planetary carrier to the clutch housing to thereby provide a multispeed transmission.

---

This invention relates to a vehicle transmission and more particularly to planetary transmission having countershaft gearing with input and output clutch housings having clutches selectively and alternatively provide a plurality of power paths through the transmission at selective gear ratios.

The power shift transmission adapts itself well to the tractor type vehicle. The power shift transmission utilizes friction members which are selectively engaged by an actuating means to provide plural power paths through the transmission at various gear ratios. For efficient operation of the transmission it is desirable to reduce the number of gears, clutches, brakes, shafts, and countershafts to a minimum. For economy in operation, it is also advisable to provide the maximum number of interchangeable parts in the transmission.

Accordingly, this invention provides a power shift transmission having an input section and an output section which have components which are selectively coupled to provide a plurality of power paths and gear ratios through the transmission. The input section delivers the torque on an input shaft which is transmitted to the output section through a planetary gearset having elements selectively coupled through an input and an output clutch housing or selectively transmitted through countershaft gearing. The coupling is accomplished through a plurality of clutches which engage the elements of the transmission to selectively transmit the power as positive and negative torque and through various of selected gear ratios to provide a resultant output torque of predetermined magnitudes and directions.

It is an object of this invention to provide a power shift transmission with planetary and countershaft gearing.

It is another object of this invention to provide a power shift transmission having a planetary gearset and a countershaft gearset with clutching to selectively provide reverse and forward speeds.

It is a further object of this invention to provide a transmission employing a single planetary gearset with input and output clutch housings driving countershaft gearing. The input and output clutch housings carry clutches which selectively engage elements of the planetary gearset to provide alternate power paths through the planetary gearset and the countershaft gearset at selected gear ratios.

The objects of this invention are accomplished in a transmission having an input and an output shaft rotating on concentric axial centers. An input clutch housing and an output clutch housing rotate concentrically with the input and output shafts. The clutch housings are driven by a countershaft gearset including gears on said clutch housings driven by a countershaft. A plurality of clutches are mounted on the input clutch housing as well as the output clutch housing. Friction elements are carried on the elements of the planetary gearset. These elements form a part of the clutches on the input and output clutch housing to thereby provide a means for selectively clutching the planetary gearset to transmit power to the housings to thereby provide a plurality of power paths through the transmission at selectively different gear ratios.

Referring to the drawing, the preferred embodiments of this invention are illustrated.

FIG. 2 illustrates a five speed transmission having a single planetary gearset.

FIG. 3 illustrates a schematic diagram of the transmission shown in FIG. 1.

FIG. 4 illustrates the table showing the gear ratios of the transmission shown in FIGS. 1 and 3.

FIG. 5 illustrates a schematic diagram of the transmission shown in FIG. 2.

FIG. 6 illustrates a table of the gear ratios and the clutches engaged for the gear ranges as shown for the transmission as shown in FIGS. 2 and 5.

Figure 1:
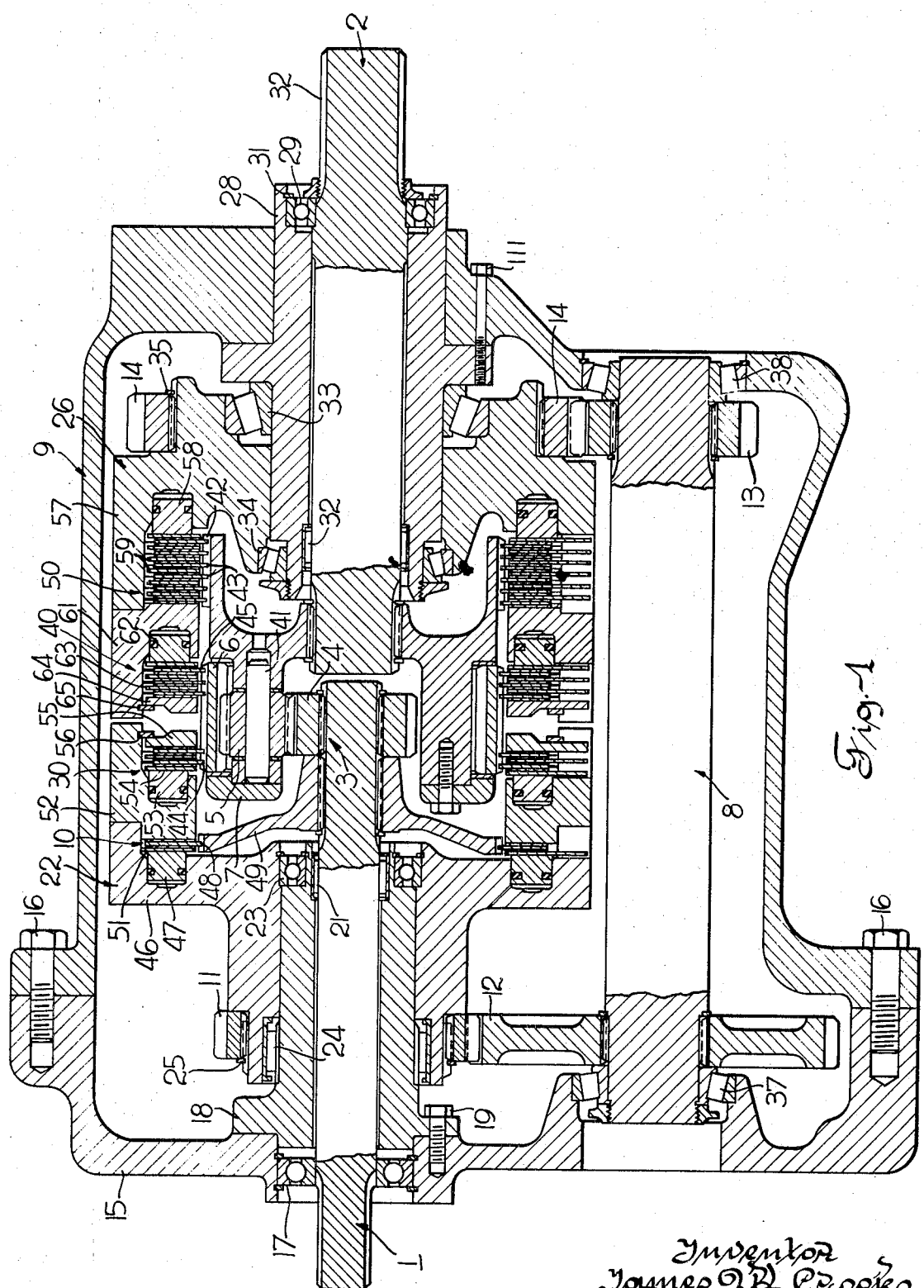
FIG. 1 illustrates a four speed transmission having a single planetary gearset.

Referring to the drawings, FIG. 1 illustrates a multispeed vehicle transmission using a single planetary gearset and countershaft gearset. The transmission includes a transmission case 9 fastened to the end plate 15 by means of a plurality of bolts 16. The end plate 15 embraces a bearing assembly 17 which encircles the input shaft 1. A support sleeve 18 is fastened by means of a plurality of bolts 19 and extends inward within the transmission case 9. The sleeve 18 forms an annular recess on its inner periphery of its inner end which receives the needle bearing assembly 21 to rotatably support the inner end of the input shaft 1. The support sleeve 18 also supports the input clutch housing 22. The external periphery of the support sleeve 18 carries the ball bearing assembly 23 and the roller bearing assembly 24 which are embraced by the input clutch housing 22. Accordingly, the input clutch housing 22 rotates on a common axial center coaxial with the input shaft 1.

The input clutch housing 22 is splined on its external periphery to receive the drive gear 11 which is retained in position by the snap ring 25. The output clutch housing 26 is also rotatably supported within the transmission case 9. The output shaft 2 is supported by the sleeve 28 which is fastened to the transmission case 9 by bolts 111. The support sleeve 28 extends axially inward within the transmission case 9 and defines an annular recess for receiving needle bearing assembly 32 which embraces the inner end of the output shaft 2. The support sleeve 28 embraces the ball bearing assembly 29 which is retained by the snap ring 31. The output shaft 2 has a splined portion 32 for transmitting power to the output side of the transmission.

The external periphery of the support sleeve 28 is encircled by the bearing assemblies 33 and 34 which in turn provide a rotatable support for the output clutch housing 26. A driven gear 14 is splined on its inner periphery to engage the mating spline portion on the external periphery on the output clutch housing 26 and is retained by a snap ring 35.

The countershaft 8 is rotatably supported by the bearing assembly 37 in the end plate 15 and also rotatably supported in the bearing assembly 38 in the transmission case 9. A drive gear 11 on the input clutch housing 22 drives the spur gear 12 which in turn rotates the countershaft 8. The countershaft 8 also carries the pinion gear 13 which drives the driven gear 14 on the output clutch housing to form the countershaft gearset.

The planetary gearset 3 includes the sun gear 4, splined to a mating splined portion on the inner end of the input shaft 1. The sun gear 4 meshes with a plurality of planetary gears 5 each carried on a pin 41. The pin 41 is carried in the planetary carrier 7 which in turn forms a splined inner periphery to receive the spline portion on the external periphery of the output shaft 2. The planetary carrier also defines a spline external periphery 42 which supports a plurality of clutch discs 43 supported thereon.

The ring gear 6 engages the planetary gears 5 and is splined on its external periphery to receive clutch discs 44 in the clutch 30 and clutch discs 45 in clutch 40.

The input clutch housing 22 includes a cylinder 46 receiving an annular piston 47 which compresses the disc stack of the clutch 10. The disc 48 is received on the annulus 49 which is splined to the input shaft 1. The disc 51 is received on a splined portion of the cylinder 46. The cylinder 52 forms a reaction plate for the disc stack of clutch 10.

The cylinder 52 receives the annular piston 53. The discs 54 have splined external peripheries and are received within the mating internally splined periphery of the cylinder 52. The reaction plate 55 is held in position by the snap ring 56. The piston 53 compresses disc stack of the clutch 30 against the reaction plate 55 to provide actuation of clutch 30.

The output clutch housing 26 is similarly constructed with the cylinder 57 receiving a piston 58. The discs 43 are received on the carrier 7 while the discs 59 are received on the splined internal periphery of the cylinder 57. The cylinder 61 operates as the reaction plate for compression of the disc stack in the clutch 50 as the piston 58 is actuated.

The output clutch housing 26 further includes the cylinder 61 which receives a piston 62. The ring gear 6 is splined on its external periphery and is received within the disc 45. A plurality of discs 63 are splined on their external periphery and received on mating splines of the internal periphery of the cylinder 61. The reaction plate 64 is retained in position by the snap ring 65 and receives the reaction force as the disc stack of the clutch 40 is compressed.

Accordingly, it is seen that the sun gear 4 or the ring gear 6 of the planetary gearset 3 can be selectively clutched to the input clutch housing 22. Likewise the ring gear 6 and the planetary carrier 7 can also be clutched to the output clutch housing 26. The selective clutching of the four clutches will provide selective power paths through the planetary gearset and/or through the countershaft gearset to provide a plurality of gear ratios.

Referring to FIG. 3, the transmission shown in FIG. 1 is schematically illustrated. The input shaft 1 carries a clutch disc 48 to frictionally engage clutch disc 51 of clutch 10 on the input clutch housing 22 for coupling housing 22 with the sun gear 4 of the planetary gearset. The clutch disc 44 and disc 54 of clutch 30 are also frictionally engaged to provide coupling of the ring gear 6 with the input clutch housing 22. The planetary carrier 7 is directly connected to the output shaft 2. The clutch disc 45 and disc 63 of clutch 40 frictionally engage to couple the ring gear 6 and the output clutch housing 26. The clutch disc 43 and disc 63 of clutch 40 frictionally engage to couple the output shaft 2 and the planetary carrier 7 with the output clutch housing 26. By selective actuation of the clutches the power is transmitted from the input shaft through the planetary gearset and the clutch housing to provide the plural power paths through the transmission.

The gear ratios and gear ranges and the clutches actuated to provide these ratios and ranges are shown on the table in FIG. 4. The actuation of the clutches will be described subsequently.

Referring to FIG. 2, a modification of the transmission is shown. The transmission shown in FIG. 2 is modified by providing an annulus 71 which extends axially to the left of clutch 20 to support a clutch disc 48 as shown in FIG. 1. The clutch 20 is interposed between clutch 10 and 30 to accommodate clutching of the planetary carrier 72 to the input clutch housing 73. For the purpose of illustration, the components of clutch 10 and 30 will be considered the same as that described in FIG. 1. With the addition of interposing the clutch 20 coupling the carrier 72 to the input clutch housing 73. The carrier 72 has an external peripheral spline 74 receiving mated spline portions of the clutch disc 75. The clutch disc 76 is received on mating splined portions 77 on the input clutch housing 73. The cylinder 78 receives the piston 79 which compresses the disc stack of the clutch 20 against the reaction plate which is formed by the cylinder 81. The addition of the clutch 20 provides an additional means for coupling components of the planetary gearset 3 with the input clutch housing 73. The output clutch housing carries the same two clutches 40 and 50 which have been previously described and will function as subsequently described in the description.

Referring to FIG. 5 the transmission shown in FIG. 2 is shown schematically. The clutch disc 75 and disc 77 of the clutch 20 couple the carrier 72 with the input clutch housing 73. The transmission shown schematically also includes hydraulic conduits 90, 91, 92, 93 and 94 connected to the clutch actuation control 95. Clutch actuation control is operated by the lever 96 which selectively actuates one or more of the clutches 10, 20, 30, 40 and 50 to provide the selected gear ratio or gear range. The pump 97 provides a source of pressurized fluid to the clutch actuating control for actuating the clutches.

The clutch actuating control 100 in FIG. 3 is connected to a plurality of hydraulic conduits 101, 102, 103 and 104 which in turn are connected to a clutch. The clutch control 100 is operated by the lever 105. A pump 106 provides a source of pressurized fluid for actuating the clutch control and the clutches 10, 30, 40 or 50 which are selectively actuated to provide the desired gear ratio and gear range as shown in the table in FIG. 4.

Referring to FIGS. 1 and 3, the operation of the clutch will be described. When the clutch 50 and the clutch 30 are actuated, the input torque passes from the sun gear 4 to the carrier 7 and ring gear 6. The negative torque of the ring gear is connected to the countershaft gearing through clutch 30. The negative torque is multiplied by the countershaft gear train and transferred to the output clutch housing 26 by the clutch 50. The difference between the positive torque applied to the carrier 7 by the sun gear 4 and the negative torque applied to the carrier 7 by the ring gear multiplied by the countershaft gear ratio gives a net result negative torque to the output shaft 2 which provides a reverse rotation and a reverse output of the transmission.

When the transmission is in the first gear range, the clutch 30 and the clutch 40 are actuated. As long as the different ratios exist between the pairs of the countershaft gears, these gears cannot rotate when the clutches 30 and 40 are actuated. The ring gear locks the transmission when clutches 30 and 40 are actuated and accordingly, the transmission operates as a simple planetary reduction to the output shaft.

When the transmission is in the second gear range, the clutch 10 and the clutch 50 are engaged which provides an input torque from the input shaft 1 which passes to the countershaft gear train by the clutch 10. The input torque is multiplied by the countershaft gear ratio and is transferred to the output shaft by the clutch 50. The planetary gear set has no function for this particular range and the gear ratio is determined by the countershaft gearing.

When the transmission is in the third gear range, the clutch 10 is engaged and also the clutch 40 is engaged which provides input torque to the sun gear and clutch 10 which is transferred to the input clutch housing 22. The portion of the torque transferred to the clutch 10 and the input clutch housing 22 is multiplied by the countershaft gear ratio and transferred to the ring gear 6 by clutch 40. The output torque is the sum of the resultant ring gear torque and the portion of the input torque going to the sun gear.

When the transmission is in the fourth gear range as shown on the table in FIG. 4 the clutch 10 is engaged which transfers torque to the input clutch housing 22 while the clutch 30 is engaged which couples the ring gear 6 of the planetary gearset to the input clutch housing 22.

The input torque passes to the sun gear 4 and through clutch 10. The clutch 10 drives the clutch 30 which is connected to the ring gear 6 of the planetary gearset 3. The planetary gearset is thereby locked together by the clutches 10 and 30 giving a direct drive to the output shaft 2.

Referring to FIGS. 2 and 5, the operation of the modified transmission will be described. This transmission utilizes three clutches on the input clutch housing 73 and two clutches on the output clutch housing 26. When the transmission is placed in reverse position, the clutch 50 couples the planetary carrier 72 with the output clutch housing 26 while the clutch 30 engages ring gear 6 with the input clutch housing 22. The input torque passes from the sun gear 4 to the carrier 72 and ring gear 6. The ring gear torque is then in a negative direction and connected to the countershaft gearing by the clutch 30. The negative torque is multiplied by the countershaft gear train and transferred to the carrier output by means of the clutch 50. The difference between the positive torque transferred to the carrier by the sun gear and the negative torque applied to the carrier by the ring gear is a net resultant negative torque output and reverse drive from the transmission.

When the clutches 30 and 40 are actuated, the ring gear is locked. The ring gear is locked since different ratios exist between the pairs of countershaft gears. When the ring gear is locked in a stationary condition, the transmission operates as a simple planetary reduction to the output shaft.

When the transmission is placed in the second gear range the clutch 20 couples the planetary carrier 72 with the input clutch housing 73, and the clutch 40 couples the ring gear with the output clutch housing 26. The input torque passes to the sun gear and this torque is transferred to the carrier 72 while the negative torque is transferred to the ring gear 6. The negative torque on the ring gear is passed by means of a clutch 40 to the countershaft gearset where the torque is reduced and passed to the clutch 20. The negative torque on clutch 20 is passed to the carrier 72. The difference between the negative torque on the carrier from the clutch 20 and the positive torque from the sun gear 4 results in a net positive torque on the output shaft 2.

When the transmission is positioned in the third gear range the clutch 10 couples the sun gear 4 with the input clutch housing 73 while the clutch 50 couples the output shaft 2 with the output clutch housing 26 to provide an input torque which passes to the countershaft gear train by the clutch 10. The input torque is multiplied by the countershaft gear train and transferred to the output shaft 2 by the clutch 50. The planetary gearset has no function for this particular gear range and the gear ratio is determined by the countershaft gearing.

When the transmission is placed in the fourth gear range the clutch 10 couples the sun gear 4 with the input clutch housing 73 while the clutch 40 couples the ring gear 6 with the output clutch housing 26. The input torque is passed to the sun gear 4 and clutch 10. The portion of the torque transferred to the clutch 10 is multiplied by the countershaft gear train and transferred to the ring gear by the clutch 40. The output torque is the sum of the resultant ring gear torque and the portion of the input torque going to the sun gear 4 and transmitted to the output shaft 2.

When the transmission is placed in the fifth gear range the clutch 10 couples the sun gear 4 with the input clutch housing 73 while the ring gear 6 is connected to the input clutch housing 73 by the clutch 30. The planetary gearset 3 is locked together by the clutches 10 and 30 providing a direct drive to the output shaft 2.

The embodiments of the invention in which an exclusive property or privilege is claimed are defined as follows:

1. A multispeed vehicle transmission comprising an input shaft and an output shaft, a planetary gearset having a sun gear connected to said input shaft, an output shaft connected to the planetary carrier of said planetary gearset, an input clutch housing rotatably mounted for concentric rotation with said input shaft and carrying a drive gear, an output clutch housing rotatably mounted for concentric rotation with said output shaft and carrying a driven gear, a countershaft gearset including a countershaft carrying a first gear driven by said drive gear and a second gear driving said driven gear on said clutch housings, a plurality of clutches on said input clutch housing, a plurality of clutches on said output clutch housing, at least one friction member on one of the elements including the sun gear, ring gear, planetary carrier of said planetary gearset forming a component of a clutch on the input clutch housing for coupling said element to said input clutch housing, at least one friction member connected to one of said elements including the planetary carrier and said ring gear of said planetary gearset forming a component of one of said clutches on said output clutch housing, control means selectively for actuating said clutches providing a plurality of power paths through said transmission at a predetermined gear ratio.

2. A transmission as set forth in claim 1 wherein a clutch on said input housing includes a friction member connected to the ring gear of said planetary gearset, a clutch on said output housing includes a friction member on said planetary carrier, of said planetary gearset to thereby provide input torque from the sun gear to the carrier transferred to the output shaft with a potrion of the torque transferred to the ring gear and input clutch housing to said countershaft gearset producing a difference torque between the countershaft gearset and the planetary gearset to provide a resultant negative torque and reverse rotation of said output shaft in said transmission.

3. A transmission as set forth in claim 1 wherein a clutch on said input clutch housing includes a friction member connected to the sun gear of said planetary gearset, a clutch on said output housing includes a friction member connected to the planetary carrier of said planetary gearset, to thereby provide a power path through the countershaft gearset to the output shaft to provide positive rotation of said output shaft rotation.

4. A transmission as set forth in claim 1 wherein a clutch on said input clutch housing includes a friction member connected to the sun gear of said planetary gearset, a clutch on said output clutch housing includes a friction member connected to the ring gear of said planetary gearset to thereby provide input torque passing to the sun gear and to the input clutch housing through the countershaft gearset and transferred to the ring gear providing ouput torque on the output shaft determined by the sum of the resultant torque of the ring gear and the sun gear as transmitted through the planetary carrier to the output shaft.

5. A transmission as set forth in claim 1 wherein a clutch on said input clutch housing includes a friction member connected to the sun gear of said planetary gearset, a clutch on said output clutch housing includes a friction member connected to the ring gear of said planetary gearset to thereby provide a locking condition of the planetary gearset and to provide a direct drive through the planetary gearset to the output shaft.

6. A transmission as set forth in claim 1 wherein a clutch on said input clutch housing includes a friction member connected to the planetary carrier of said planetary gearset, a clutch on said output clutch housing includes a friction member connected to the ring gear on said planetary gearset to produce negative torque on the planetary carrier and a positive torque on the ring gear whereby the resultant torque on the output shaft is the difference between the negative torque on the carrier and the positive torque on the sun gear which results in a forward rotation of the output shaft.

7. A transmission as set forth in claim 1 wherein the ends of said input and said output shaft are adjacent and concentric with each other, said planetary gearset is mounted on the end of said input shaft, said clutches on said input clutch housing and said output clutch housing include annular cylinders and pistons mounted concentrically with said input and output shafts.

8. A transmission as set forth in claim 1 wherein said input clutch housing carries two clutches including friction members carried on said planetary gearset for selectively coupling elements of said planetary gearset to said clutch housing, said output clutch housing includes two clutches including friction members carried on said planetary gearset for selectively coupling elements of said planetary gearset to said output housing.

9. A transmission as set forth in claim 1 wherein said input clutch housing carries three clutches with each clutch including a friction member singularly connected to said elements of said planetary gearset for selectively coupling said elements to said input clutch housing, said output clutch housing carries two clutches each including a friction member connected to an element of said planetary gearset for selectively coupling said elements to the output clutch housing.

10. A transmission as set forth in claim 1 wherein the carrier of said planetary gearset includes a friction member carried in a clutch on said input clutch housing and carries a friction member carried in a clutch on the output clutch housing, said ring gear of said planetary gearset carries a friction member included in a clutch on the input clutch housing and a friction member included in the clutch on the output clutch housing to thereby selectively couple said carrier and said ring gear to each of said housings.

References Cited

UNITED STATES PATENTS

| | | | |
|---|---|---|---|
| 2,511,039 | 6/1950 | Black et al. | 74—720 |
| 2,793,533 | 5/1957 | Swenson et al. | 74—15.63 |
| 2,932,202 | 4/1960 | Rinkema | 74—15.63X |
| 3,065,643 | 11/1962 | Mark et al. | 74—15.63 |
| 3,430,518 | 3/1969 | Auriol | 74—705 |
| 3,487,723 | 1/1970 | Piot | 74—682 |
| 3,487,724 | 1/1970 | McIntyre et al. | 74—15.63X |

ARTHUR T. McKEON, Primary Examiner

U.S. Cl. X.R.

74—674, 705, 750